United States Patent
Rambo

(10) Patent No.: US 11,879,392 B2
(45) Date of Patent: *Jan. 23, 2024

(54) GAS SUPPLY SYSTEM

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,518

(22) Filed: Dec. 30, 2022

(65) Prior Publication Data

US 2023/0184169 A1 Jun. 15, 2023

Related U.S. Application Data

(63) Continuation of application No. 17/534,518, filed on Nov. 24, 2021, now Pat. No. 11,542,870.

(51) Int. Cl.
*F02C 7/22* (2006.01)

(52) U.S. Cl.
CPC .......... *F02C 7/22* (2013.01); *F05D 2220/323* (2013.01); *F05D 2240/35* (2013.01); *F05D 2260/213* (2013.01)

(58) Field of Classification Search
CPC .. F02C 7/22; F02C 7/222; F02C 7/224; F23R 2900/00004; F23R 2900/05082; F23D 2209/30; F23K 5/16; F23K 5/18; F23K 2300/203
See application file for complete search history.

(56) References Cited

U.S. PATENT DOCUMENTS

| | | | |
|---|---|---|---|
| 2,582,842 | A | 1/1952 | Messinger |
| 2,720,313 | A | 10/1955 | Pattison |
| 2,893,628 | A | 7/1959 | Herman |
| 3,050,240 | A | 8/1962 | Darnell |
| 3,178,105 | A | 4/1965 | Darnell |
| 3,590,559 | A | 7/1971 | Bragg |

(Continued)

FOREIGN PATENT DOCUMENTS

| | | |
|---|---|---|
| EP | 2003311 A2 | 12/2008 |
| EP | 3018304 A1 | 5/2016 |

(Continued)

OTHER PUBLICATIONS

Kelburn Engineering, Landfill, Sewage, Biogas, Coal, Seam & Mines Gas Separation/Filtration, LandfillGas and Air Separation, 3 pages. www.kelbureng.com.uk//landfill-gas-bio-gas-sewer-gas.php.

*Primary Examiner* — Todd E Manahan
*Assistant Examiner* — Sean V Meiller
(74) *Attorney, Agent, or Firm* — Dority & Manning, P.A.

(57) ABSTRACT

A gas supply system is provided herein. The gas supply system includes a fuel oxygen reduction unit having a circuit defining a gas flowpath for a flow of a stripping gas. A reservoir is in selective fluid communication with the fuel oxygen reduction unit and is configured to store a portion of the stripping gas from the circuit. The reservoir is further configured to be in selective fluid communication with the fuel system component when installed in a vehicle to provide the stored portion of the stripping gas to the fuel system component in response to detection of a purge condition.

16 Claims, 3 Drawing Sheets

(56) References Cited

U.S. PATENT DOCUMENTS

| | | |
|---|---|---|
| 3,722,217 A | 3/1973 | Reynolds et al. |
| 3,847,298 A | 11/1974 | Hamilton |
| 3,895,243 A | 7/1975 | Amend et al. |
| 3,902,658 A | 9/1975 | Madsen |
| 4,033,115 A | 7/1977 | Baits |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 4,782,658 A | 11/1988 | Perry |
| 4,817,890 A | 4/1989 | Coffinberry |
| 5,149,018 A | 9/1992 | Clark |
| 5,267,608 A | 12/1993 | Coffinberry |
| 5,277,023 A | 1/1994 | Bradley et al. |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,125,624 A | 10/2000 | Prociw |
| 6,134,876 A | 10/2000 | Hines et al. |
| 6,182,435 B1 | 2/2001 | Niggemann et al. |
| 6,244,034 B1 | 6/2001 | Taylor et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,550,717 B2 | 4/2003 | MacCready et al. |
| 6,701,717 B2 | 3/2004 | Flatman et al. |
| 6,702,729 B2 | 3/2004 | Mazzuca |
| 6,887,599 B2 | 5/2005 | Reiser et al. |
| 6,892,544 B2 | 5/2005 | Futa, Jr. et al. |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,016,228 B2 | 9/2011 | Fucke et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-Wlam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,103,284 B2 | 8/2015 | Erickson et al. |
| 9,103,285 B2 | 8/2015 | Raju et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 9,909,500 B2 | 3/2018 | Ott et al. |
| 10,473,060 B2 | 11/2019 | Montagne |
| 10,563,588 B2 | 2/2020 | Toon |
| 10,774,741 B2 | 9/2020 | Sennoun |
| 2008/0128048 A1 | 6/2008 | Johnson et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0167831 A1 | 7/2011 | Johnson |
| 2011/0262309 A1 | 10/2011 | Limaye et al. |
| 2012/0087807 A1 | 4/2012 | Buchwald |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 | 6/2016 | Lo et al. |
| 2016/0177879 A1 | 6/2016 | Montagne |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |

(56) References Cited

U.S. PATENT DOCUMENTS

| | | |
|---|---|---|
| 2019/0002119 A1 | 1/2019 | Jensen et al. |
| 2019/0153952 A1 | 5/2019 | Niergarth et al. |
| 2019/0153953 A1 | 5/2019 | Niergarth et al. |
| 2020/0140113 A1 | 5/2020 | Niergarth et al. |

FOREIGN PATENT DOCUMENTS

| | | |
|---|---|---|
| EP | 3075957 A1 | 10/2016 |
| GB | 20136880 A | 9/1984 |
| JP | S5932893 U | 2/1984 |
| WO | WO 02/38938 A1 | 5/2002 |
| WO | WO2006/079438 A1 | 8/2006 |

GAS SUPPLY SYSTEM

PRIORITY INFORMATION

The present application claims priority to, and is a continuation of, U.S. patent application Ser. No. 17/534,518, titled "GAS SUPPLY SYSTEM", and filed on Nov. 24, 2021, which is incorporated by reference herein.

FIELD

The present subject matter relates generally to a gas supply system for an engine and a method of operating the same.

BACKGROUND

Typical aircraft propulsion systems include one or more gas turbine engines. The gas turbine engines generally include a turbomachine with the turbomachine including, in serial flow order, a compressor section, a combustor or a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to the atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
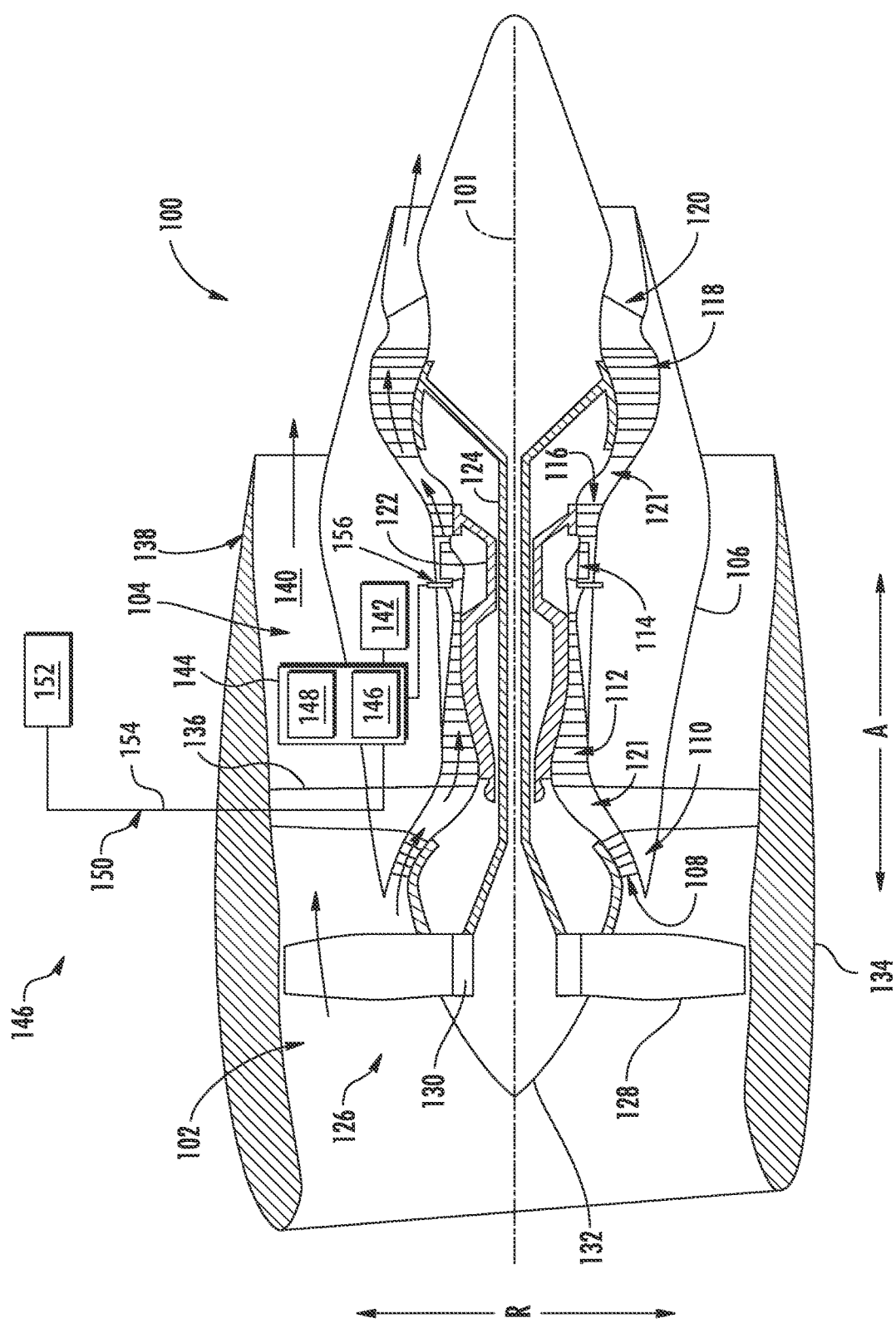
FIG. 1 is a schematic, cross-sectional view of a gas turbine engine in accordance with various aspects of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein. Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a", "an", and "the" include plural references unless the context clearly dictates otherwise.

The term "at least one of" in the context of, e.g., "at least one of A, B, and C" refers only A, only B, only C, or any combination of A, B, and C. Additionally, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, and/or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

In general, the present disclosure is directed to a gas supply system incorporating a fuel oxygen reduction unit and a reservoir. The fuel oxygen reduction unit may include a contactor including a fuel inlet configured to receive a flow of a fuel and a stripping gas inlet configured to receive a flow of a stripping gas. The contactor is configured to form a stripping gas/fuel mixture from the fuel and the stripping gas.

A separator is configured to receive the stripping gas/fuel mixture from a mixture line fluidly coupling the contactor to the separator. Within the separator, the stripping gas, which may have a relatively high oxygen content, may be separated from the fuel, which may have a relatively low oxygen content, back into respective flows of an outlet stripping gas and an outlet fuel.

The fuel oxygen reduction unit may further include a circuit defining a gas flowpath from the separator to the contactor. The circuit can include a compressor downstream of the separator, a heater positioned downstream of the compressor, and/or a catalyst downstream of the heater, the catalyst configured to reduce the oxygen content of the stripping gas.

In some instances, a reservoir may be in fluid communication with the fuel oxygen reduction unit at a location downstream of the separator and upstream of the contactor. The reservoir is configured to store a portion of the stripping gas therein. In some instances, the stripping gas is subsequently provided from the reservoir to a fuel system component in response to detection of a purge condition. For example, the stripping gas may be directed to the fuel manifold, a fuel nozzle within a combustor or a combustion section of a turbine, the fuel source, an ullage of a fuel source, or any other component of the fuel system. Further, the stripping gas may additionally be directed to any other component that is within the gas turbine engine and/or an aircraft. Additionally, the purge condition may be a shutdown operating mode of a turbine operably coupled with the fuel system, a component of the fuel system exceeding a predefined temperature threshold, a change in a flight condition, and/or any other condition.

By purging the fuel system component using the stripping gas stored in the reservoir, an amount of coke accumulation may be reduced. In addition, the stripping gas may also increase the rate at which the fuel system component and/or other components of the gas turbine engine may be cooled. By increasing the rate of the cooling process of the fuel system component and/or other components of the gas turbine engine (i.e., cooling such component(s) quicker), the amount of coke accumulation can further be reduced. Additionally or alternatively, by providing the stripping gas to the fuel system component, additional negative impacts on the gas turbine engine may be reduced. Further, the gas supply system may be configured to exhaust the stripping gas at a pressure that is generally higher than a pressure that is obtainable by commercially available On-Board Inert Gas Generation System (OBIGGS) systems.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline or axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112, a combustor or a combustion section 114, a turbine section including a high pressure (HP) turbine 116 and a low pressure (LP) turbine 118, and a jet exhaust nozzle section 120. The compressor section, combustion section 114, and turbine section together define at least in part a core air flowpath 121 extending from the annular inlet 108 to the jet exhaust nozzle section 120. The turbofan engine 100 further includes one or more drive shafts. More specifically, the turbofan engine 100 includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced-apart manner. The fan blades 128 and disk 130 are together rotatable about the longitudinal axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a gas supply system 144 that includes a fuel oxygen reduction unit 146 and/or a reservoir 148, and a fuel system 150. Although for the embodiment shown, the accessory gearbox 142 is located within the outer casing 106 of the turbomachine 104, it is contemplated that the accessory gearbox 142 may be located within other portions of the turbomachine 104. For example, the accessory gearbox 142 may be located within portions of the fan 126 of the turbomachine 104, e.g., a fan cowl or other portion of the fan 126. In such a configuration, the accessory gearbox 142 is not mounted on the core, but may still be driven by the HP shaft 122, and may not readily have access to the engine bleeds. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122.

Further, for the embodiment shown, the fuel oxygen reduction unit 146 is coupled to, or otherwise rotatable with, the accessory gearbox 142, although in other embodiments the fuel oxygen reduction unit 146 may use other, or additional sources, of power, such as an electric motor. In such a manner, it will be appreciated that the exemplary fuel oxygen reduction unit 146 is driven by the accessory gearbox 142. Notably, as used herein, the term "fuel oxygen conversion or reduction" generally means a device capable of reducing an oxygen content of the fuel.

Moreover, the fuel system 150 generally includes a fuel source 152, such as a fuel tank, and one or more fuel lines 154. The one or more fuel lines 154 provide a fuel flow through the fuel system 150 to the combustion section 114 of the turbomachine 104 of the turbofan engine 100 through a fuel manifold 156.

In some embodiments, the gas supply system 144 may further include the reservoir 148 configured to store a pressurized fluid (e.g., an inert stripping gas) therein. In such embodiments, the gas supply system 144 may exhaust the pressurized fluid in response to detection of a purge condition, such as detection of a shutdown operating mode of the turbomachine 104. In several instances, the fuel oxygen reduction unit 146 may be configured to discharge the pressurized fluid through the fuel manifold 156 (and/or another component of the turbomachine) to purge residual fuel within the fuel manifold 156 and cool the fuel manifold 156. The removal of the stagnate fuel can reduce coke accumulation as the fuel reabsorbs oxygen when exposed to ambient air. As such, the gas supply system 144 may provide additional safety for the turbomachine at shutdown.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the gas supply system 144 including the fuel oxygen reduction unit 146 and the reservoir 148 positioned within the turbomachine 104, i.e., within the outer casing 106 of the turbomachine 104, in other embodiments, the fuel oxygen reduction unit 146 and/or the reservoir 148 may be positioned at any other suitable location. For example, in other embodiments, the fuel oxygen reduction unit 146 may instead be positioned remote from the turbofan engine 100, such as proximate to, or within, the tank of the fuel system 150. Additionally or alternatively, in other embodiments, the fuel oxygen reduction unit 146 and/or the reservoir 148 may be driven by other suitable power sources such as an electric motor, a hydraulic motor, or an independent mechanical coupling to the HP or LP shaft, etc.

Figure 2:
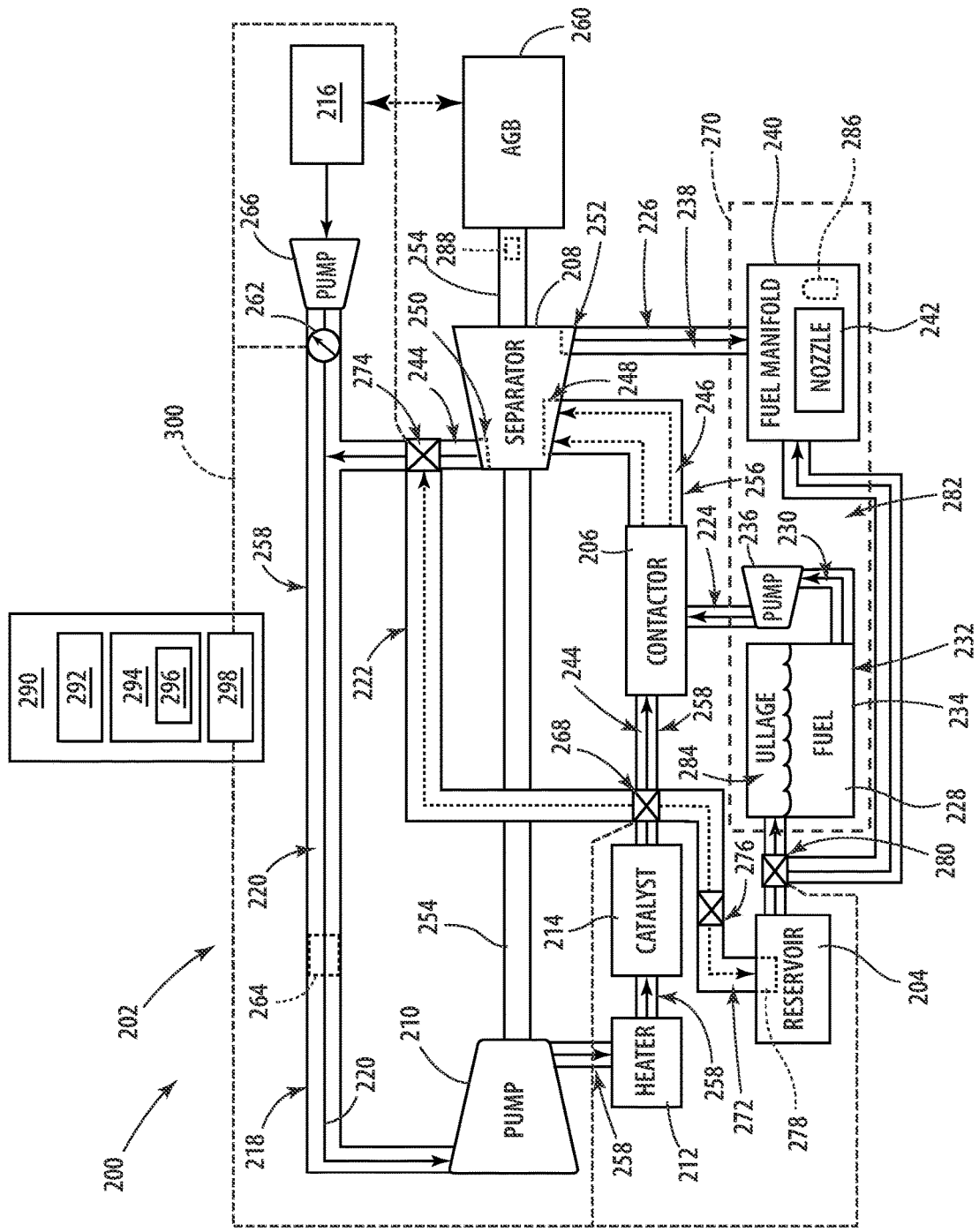
FIG. 2 is a schematic view of a fuel oxygen reduction unit in accordance with various aspects of the present disclosure.

Referring now to FIG. 2, a schematic drawing of a gas supply system 200 including a fuel oxygen reduction unit 202 and a reservoir 204 for a gas turbine engine is illustrated in accordance with exemplary embodiments of the present disclosure. In at least certain exemplary embodiments, the gas supply system 200, the fuel oxygen reduction unit 202, and the reservoir 204 depicted in FIG. 2 may be incorporated into, e.g., the exemplary turbofan engine 100 described above with reference to FIG. 1 (e.g., the gas supply system 200 may be the gas supply system 144 depicted in FIG. 1 and described above, the fuel oxygen reduction unit 202 may be the fuel oxygen reduction unit 146 depicted in FIG. 1 and described above, and the reservoir 204 may be the reservoir 148 depicted in FIG. 1 and described above).

In some embodiments, such as the one illustrated in FIG. 2, the fuel oxygen reduction unit 202 can generally include a contactor 206, a separator 208, a compressor 210 (or pump), a heater 212, a catalyst 214, and a gas source 216. Moreover, the fuel oxygen reduction unit 202 includes a circuit 218 that defines one or more flowpaths. For example, the circuit 218 can generally define a circulation gas flowpath 220 from the separator 208 to the contactor 206, with, for the embodiment depicted in FIG. 2, the compressor 210, the heater 212, and the catalyst 214 positioned within or otherwise fluidly connected to the circulation gas flowpath 220. In addition, the circuit 218 may also define a bypass gas flowpath 222 that is configured to receive gas downstream of the catalyst 214 and upstream of the compressor 210.

In some examples, the gas supply system 200 may be operable with a fuel system 270, such as the fuel system 150 of the gas turbine engine described in FIG. 1. The fuel system 270 can generally include an inlet fuel line 224 and an outlet fuel line 226. The inlet fuel line 224 is fluidly connected to the contactor 206 for providing a flow of liquid fuel 228 or an inlet fuel flow 230 to the contactor 206 (e.g., from a fuel source 232, such as a fuel tank 234). In some instances, a fuel pump 236 may be fluidly coupled with the inlet fuel line 224 and configured to direct liquid fuel 228 from the fuel source 232 to the contactor 206.

The outlet fuel line 226 is fluidly connected to the separator 208 for receiving a flow of deoxygenated liquid fuel 238 or outlet fuel flow. The outlet fuel line 226 may be further operably coupled with a fuel manifold 240 and/or a fuel nozzle 242 for delivering outlet fuel 238 to a combustion section of a turbine, such as the combustion section 114 of the gas turbine engine described in FIG. 1.

In exemplary embodiments, the contactor 206 may be configured in any suitable manner to substantially mix a received gas and liquid flow. For example, the contactor 206 may receive a stripping gas 244 and the liquid fuel 228. It will be appreciated that the term "stripping gas" is used herein as a term of convenience to refer to a gas generally capable of performing the functions described herein. The stripping gas 244 flowing through any of the components described herein may be an actual stripping gas functioning to strip oxygen from the liquid fuel 228 within the contactor 206, or alternatively may be a sparging gas bubbled through the liquid fuel 228 to reduce an oxygen content of such fuel. For example, the stripping gas 244 may be an inert gas, such as nitrogen or carbon dioxide ($CO_2$), a gas mixture made up of at least 50% by mass inert gas, or some other gas or gas mixture having a relatively low oxygen content.

The stripping gas 244 may be received through the circulation gas flow path and the liquid fuel 228 may be received from the fuel system 270. The contactor 206 may be configured to form a stripping gas/fuel mixture 246. In certain embodiments, the contactor 206 may be a mechanically driven contactor (e.g., having paddles for mixing the received flows), or alternatively may be a passive contactor for mixing the received flows using, at least in part, a pressure and/or flow rate of the received flows. For example, a passive contactor may include one or more turbulators, a venturi mixer, etc.

In various embodiments, the separator 208 is downstream of the contactor 206 and is configured to receive the stripping gas/fuel mixture 246 from the contactor 206 through a separator inlet 248. Within the separator 208, the stripping gas 244, which may have relatively high oxygen content, may be separated from the liquid fuel 228, which may have a relatively low oxygen content, back into respective flows of an outlet stripping gas 244 and outlet fuel 238. In turn, the stripping gas 244 may be exhausted from the separator 208 through a stripping gas outlet 250 and the outlet fuel 238 may be exhausted from the separator 208 through a fuel outlet 252. In addition, the separator 208 may also increase a pressure of the separated outlet fuel 238.

In some embodiments, the separator 208 may be a dual separator pump. For example, the separator 208 defines a central axis, radial direction, and a circumferential direction extending about the central axis. Additionally, the separator 208 may be configured as a mechanically-driven dual separator pump, such as a rotary/centrifugal dual separator pump. Accordingly, the separator 208 may include an input shaft 254 and a single-stage separator/pump assembly. The input shaft 254 may be mechanically coupled to the single-stage separator/pump assembly, and the two components are together rotatable about the central axis. Further, the input shaft 254 may be mechanically coupled to, and driven by, e.g., an accessory gearbox (AGB) 260 (such as the exemplary accessory gearbox 142 of FIG. 1). However, in other embodiments, the input shaft 254 may be mechanically coupled to any other suitable power source, such as an electric motor, a permanent magnet alternator (PMA), or another power source.

Additionally, in some examples, the single-stage separator/pump assembly may include an inner gas filter arranged along the central axis and a plurality of paddles positioned outward of the inner gas filter along the radial direction. During operation, a rotation of the single-stage separator/pump assembly about the central axis, and more specifically, a rotation of the plurality of paddles about the central axis (i.e., in the circumferential direction), may generally force heavier liquid fuel 228 outward along the radial direction and lighter stripping gas 244 inward along the radial direction through the inner gas filter. In such a manner, the outlet fuel 238 may exit through the fuel outlet 252 of the separator 208 and the outlet stripping gas 244 may exit through the stripping gas outlet 250 of the separator 208.

As illustrated, in some examples, the contactor 206 is fluidly coupled with the separator 208 through a mixture line 256. In some instances, the circuit 218 can further include a plurality of stripping gas lines 258, which together at least in part define a circulation gas flowpath 220 extending from the separator 208 to the contactor 206. In addition to the plurality stripping gas lines 258, the circulation gas flowpath 220 may be formed of any combination of one or more conduits, tubes, pipes, etc., and structures or components to define the circulation gas flowpath 220.

Referring further to FIG. 2, in various embodiments, the fuel oxygen reduction unit 202 can also include the compressor 210, the heater 212, and the catalyst 214 arranged within the circulation gas flowpath 220 in series flow.

In some embodiments, the compressor 210 can be configured as a rotary gas pump mechanically coupled to, and driven by the fuel gas separator 208. In such a manner, the compressor 210 is rotatable with fuel gas separator 208. However, in other embodiments, the compressor 210 may be configured in any other suitable manner. For example, in other embodiments, the compressor 210 may be mechanically disconnected from, and independently rotatable relative to, the fuel gas separator 208. For example, in certain embodiments, the compressor 210 and/or separator 208 may be independently coupled to an accessory gearbox or may be an electric compressor or pump electrically coupled to a suitable electrical power source, such as a permanent magnet alternator (PMA) that may also serve to provide power to a full authority digital control engine controller (FADEC). In several embodiments where the compressor 210 is coupled to a power source independent of the separator 208, the compressor 210 may rotate at a different rotational speed than the fuel gas separator 208.

In some embodiments that use a PMA as a power source for the compressor 210 and/or the separator 208, a FADEC may be powered by a dedicated PMA, which is in turn rotated by/driven by an accessory gearbox of a gas turbine engine. The PMA is therefore sized to be capable of providing a sufficient amount of electrical power to the FADEC during substantially all operating conditions, including relatively low-speed operating conditions, such as start-up and idle. As the engine comes up to speed, however, the PMA may generate an increased amount of electric power, while an amount of electric power required to operate the FADEC may remain relatively constant. Accordingly, as the engine comes up to speed, the PMA may generate an amount of excess electric power that may be dissipated through an electrical sink.

In some instances, a power consumption usage of the fuel oxygen reduction unit 202 may complement the power generation of the PMA. For example, the fuel oxygen reduction unit 202 may use a relatively low amount of electric power during low rotational speeds of the gas turbine engine (when the PMA is not creating much excess electrical power), and a relatively high amount of electric power during high rotational speeds of the gas turbine engine (when the PMA is creating excess electrical power). Accordingly, by using the PMA to power the fuel oxygen reduction unit 202, the electrical power generated by the PMA may be more efficiently utilized.

It will be appreciated, however, that such a configuration is by way of example only, and in other embodiments, the FADEC may be any other suitable engine controller, the PMA may be any other suitable electric machine, etc. Accordingly, in certain embodiments, an engine system is provided for an aircraft having an engine and an engine controller. The engine system includes an electric machine configured to be in electrical communication with the engine controller for powering the engine controller; and a fuel oxygen reduction unit 202 defining a liquid fuel flowpath and a stripping gas flowpath and configured to transfer an oxygen content of a fuel flow through the liquid fuel flowpath to a stripping gas flow through the stripping gas flowpath, the fuel oxygen reduction unit 202 also in electrical communication with the electric machine such that the electric machine powers at least in part the fuel oxygen reduction unit 202.

During operation, a flow of stripping gas 244 flows through the circulation gas flowpath 220 of the circuit 218 from the stripping gas outlet 250 of the separator 208 to the contactor 206. More specifically, during operation, the stripping gas 244 flows from the stripping gas outlet 250 of the separator 208, through the compressor 210 wherein a pressure of the stripping gas 244 is increased to provide for the flow of the stripping gas 244 through the circulation gas flowpath 220. From the compressor 210, the flow of stripping gas 244 passes through the heater 212, which is configured to add heat energy to the gas flowing therethrough. Next, the flow of stripping gas 244 passes through the catalyst 214 where the oxygen content of the stripping gas 244 is reduced. The stripping gas 244 is then provided to the contactor 206, wherein the stripping gas 244 is mixed with the flow of inlet liquid fuel 228 from the inlet fuel line 224 to generate a stripping gas/fuel mixture 246. The stripping gas/fuel mixture 246 generated within the contactor 206 is provided to the separator inlet 248 of the separator 208.

Generally, it will be appreciated that during the operation of the fuel oxygen reduction unit 202, the inlet liquid fuel 228 provided through the inlet fuel line 224 to the contactor 206 may have a relatively high oxygen content. The stripping gas 244 provided to the contactor 206 may have a relatively low oxygen content or other specific chemical structure. Within the contactor 206, the inlet liquid fuel 228 is mixed with the stripping gas 244, resulting in the stripping gas/fuel mixture 246. As a result of such mixing a physical exchange may occur whereby at least a portion of the oxygen within the inlet liquid fuel 228 is transferred to the stripping gas 244, such that the fuel system component of the stripping gas/fuel mixture 246 has a relatively low oxygen content (as compared to the inlet liquid fuel 228 provided through inlet fuel line 224) and the stripping gas component of the stripping gas/fuel mixture 246 has a relatively high oxygen content (as compared to the inlet stripping gas 244 provided through the circulation gas flowpath 220 to the contactor 206).

Within the separator 208, the relatively high oxygen content stripping gas 244 is then separated from the relatively low oxygen content liquid fuel 228 back into respective flows of an outlet stripping gas 244 and outlet fuel 238.

Further, it will be appreciated that with such a configuration, the outlet fuel 238 exiting the separator 208 through the fuel outlet 252 may be at a higher pressure than the inlet liquid fuel 228 provided through inlet fuel line 224, and further higher than the stripping gas/fuel mixture 246 provided through the separator inlet 248. Such may be due at least in part to the centrifugal force exerted on such liquid fuel 228 and the rotation of the plurality of paddles. Additionally, it will be appreciated that for some embodiments, the fuel outlet 252 is positioned outward of the separator inlet 248 along the radial direction. Such may also assist with the increasing of the pressure of the outlet fuel 238 provided through the fuel outlet 252 of the separator 208.

In various embodiments, the separator 208 of the fuel oxygen reduction unit 202 may generate a pressure rise in the fuel flow during operation. In at least certain exemplary embodiments, the pressure rise of the liquid fuel 228 may be at least about sixty (60) pounds per square inch ("psi"), such as at least about ninety (90) psi, such as at least about one hundred (100) psi, such as up to about seven hundred and fifty (750) psi. With such a configuration, it will be appreciated that in at least certain exemplary embodiments of the present disclosure, the liquid fuel outlet pressure may be at least about seventy (70) psi during operation. For example, in at least certain exemplary embodiments, the liquid fuel out of pressure may be at least about one hundred (100) psi during operation, such as at least about one hundred and twenty-five (125) psi during operation, such as up to about eight hundred (800) psi during operation.

Further, it will be appreciated that the outlet fuel 238 provided to the fuel outlet 252, having interacted with the stripping gas 244, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the outlet fuel 238 provided to the fuel outlet 252 may have an oxygen content of less than about five (5) parts per million ("ppm"), such as less than about three (3) ppm, such as less than about two (2) ppm, such as less than about one (1) ppm, such as less than about 0.5 ppm.

Moreover, the fuel oxygen reduction unit 202 can recirculate and reuse at least some of, or all of the stripping gas 244. However, the stripping gas 244 exiting the separator 208, having interacted with the liquid fuel 228, has a relatively high oxygen content. Accordingly, in order to reuse the stripping gas 244, an oxygen content of the stripping gas 244 from the stripping gas outlet 250 of the separator 208 may be reduced. As such, the stripping gas 244 flows through the heater 212 and through the catalyst 214 where the oxygen content of the stripping gas 244 is reduced. For instance, within the catalyst 214, the relatively oxygen-rich stripping gas 244 is reacted to reduce the oxygen content thereof. It will be appreciated that catalyst 214 may be configured in any suitable manner to perform such functions. For example, in certain embodiments, the catalyst 214 may be configured to combust the relatively oxygen-rich stripping gas 244 to reduce an oxygen content thereof. However, in other embodiments, the catalyst 214 may additionally, or alternatively, include geometries of catalytic components through which the relatively oxygen-rich stripping gas 244 flows to reduce an oxygen content thereof. In one or more of these configurations, a byproduct may be produced, such as water. The water, if produced, may be in vapor form and continue as part of the stripping gas 244. Alternatively, the water or other byproduct, if produced, may be ducted away from the catalyst 214 (duct not depicted in the embodiment of FIG. 2). In one or more of these embodiments, the catalyst 214 may be configured to reduce an oxygen content of the stripping gas 244 to less than about five percent (5%) oxygen (O2) by mass, such as less than about two (2) percent (3%) oxygen (O2) by mass, such as less than about one percent (1%) oxygen (O2) by mass.

The resulting relatively low oxygen content gas is then provided through the remainder of the circulation gas flowpath 220 and back to the contactor 206, such that the cycle may be repeated. In such a manner, it will be appreciated that the stripping gas 244 may be any suitable gas capable of undergoing the chemical transitions described above.

With further reference to FIG. 2, it will also be appreciated that the fuel oxygen reduction unit 202 depicted includes a makeup or gas source 216 fluidly connected to the circulation gas flowpath 220. In some embodiments, the gas source 216 may be from the AGB 260 and the stripping gas 244 may be from accessory gearbox air. The makeup or gas source 216 is selectively in fluid communication with the circulation gas flowpath 220 for selectively introducing a stripping gas 244 from the gas source 216 to the circulation gas flowpath 220. For example, the stripping gas 244 can enter the circulation gas flowpath 220 downstream of the separator 208 and upstream of the contactor 206. It is contemplated that the accessory gearbox air may include accessory gearbox vent air.

For the embodiment depicted, the gas source 216 is in airflow communication with the circulation gas flowpath 220 through a variable flow valve 262, which may be actuatable to supply additional gas to the circulation gas flowpath 220 as needed. Referring to FIG. 2, the variable flow valve 262 is downstream of the gas source 216 and upstream of the contactor 206. In some instances, the fuel oxygen reduction unit 202 may include one or more sensors 264 for determining an airflow volume/flowrate through the circulation gas flowpath 220 to determine an amount of, if any, makeup gas that is needed. By utilizing a makeup or gas source 216 that includes accessory gearbox air from the AGB 260, the system may eliminate weight and the routing of additional components while also providing a source of makeup gas near the fuel oxygen reduction unit 202. The makeup or gas source 216 may include different configurations based on the amount of pressure for a particular application.

In some instances, a compressor 266 or pump may be positioned downstream of the gas source 216 and upstream of the variable flow valve 262. In such instances, the compressor 266 can be used to increase a pressure of the stripping gas 244 flowing to the circulation gas flowpath 220, which may be helpful in lower pressure applications, such as commercial applications. In such applications, the compressor 266 can increase the pressure of the stripping gas 244 flowing to the circulation gas flowpath 220 enough to enter the system. In exemplary embodiments, the compressor 266 may be a rotary screw compressor, a reciprocating compressor, an axial compressor, a centrifugal compressor, and/or any other practicable type of compressor. In exemplary embodiments utilizing a pump in lieu of a compressor, the pump may be a diaphragm, a piston, a scroll, or other pumping mechanism that could be gear, cam, or electrically driven. Additionally or alternatively, an eductor may be downstream of the gas source 216 and upstream of the variable flow valve 262. In such instances, the eductor can be used to direct the stripping gas 244 to the circulation gas flowpath 220 and may be used in medium pressure applications, and/or any other application. Additionally or alternatively, an orifice can be used in a pure pressure-driven system. Such a configuration may be used in higher pressure applications. For example, if the gas source pressure is greater than the low side gas boost pressure, e.g., with a high enough accessory gearbox pressure, the system is passive, and the stripping gas 244 is driven to the circulation gas flowpath 220 by this high pressure. In such an embodiment, a compressor may not be needed to increase the pressure of the stripping gas 244 flowing to the circulation gas flowpath 220.

Referring still to FIG. 2, in some embodiments, a control valve 268 may be positioned within the circuit 218 for controlling a flow of the stripping gas 244 through the circulation gas flowpath 220 to the contactor 206, the bypass gas flowpath 222, and/or a reservoir gas flowpath 272. In various embodiments, the control valve 268 may be configured as one or more shutoff valves, diverter valves, and/or any other practical type of valve. It should also be appreciated that the term "diverter valve" simply refers to a valve, or plurality of valves capable of redirecting at least a portion of a fluid flow from a first fluid path to a second fluid path and/or a third fluid flowpath. Accordingly, any diverter valve described herein may be configured as a variable, three-way fluid valve, as a two-way shut-off valve (located downstream of a junction), as a pair of shut-off valves, etc.

In the embodiment illustrated in FIG. 2, in a first position, the control valve 268 may direct at least a portion of the stripping gas 244 along the circulation gas flowpath 220 upstream of the contactor 206. In a second position, the control valve 268 may direct at least a portion of the stripping gas 244 into the bypass gas flowpath 222. The bypass gas flowpath 222 is configured to direct the stripping gas 244 upstream of the contactor 206 to a location of the circulation gas flowpath 220 downstream of the separator 208. As such, when the control valve 268 is in the second position, at least a portion of the stripping gas 244 bypasses the contactor 206 and the separator 208. In a third position, the control valve 268 may direct at least a portion of the stripping gas 244 into the reservoir gas flowpath 272. The reservoir gas flowpath 272 may be fluidly coupled with the reservoir 204. It will be appreciated that the control valve 268 may direct all of the stripping gas 244 towards any of the flowpaths described herein when placed in a defined position. Additionally or alternatively, the control valve 268 may direct a first portion of the stripping gas 244 towards any of the flowpaths described herein and a second portion of the stripping gas 244 towards any of the remaining flowpaths described herein when placed in a defined position. In various embodiments, the first portion may be less than one-hundred percent (100%), ninety percent (90%), eighty percent (80%), seventy percent (70%), sixty percent (60%), fifty percent (50%), forty percent (40%), thirty percent (30%), twenty percent (20%), or ten percent (10%) of the stripping gas 244 that passes through the control valve 268. Likewise, the second portion may be less than one-hundred percent (100%), ninety percent (90%), eighty percent (80%), seventy percent (70%), sixty percent (60%), fifty percent (50%), forty percent (40%), thirty percent (30%), twenty percent (20%), or ten percent (10%) of the stripping gas 244 that passes through the control valve 268.

A bypass valve 274 may fluidly couple with the bypass gas flowpath 222 and the circulation gas flowpath 220. In some instances, the bypass valve 274 may be configured as one or more shutoff valves, diverter valves, and/or any other practicable type of valve. In various embodiments, the bypass valve 274 may be placed in a first position in which the stripping gas 244 flows from the separator 208, through the bypass valve 274, and onto the contactor 206. In addition, in several embodiments, the bypass valve 274 may be placed in a second position in which the stripping gas 244 within the bypass gas flowpath 222 is directed into the circulation gas flowpath 220.

With further reference to FIG. 2, in several embodiments, a check valve 276 may be positioned within the reservoir gas flowpath 272. The check valve 276 is configured to open to allow flow in a downstream direction from the control valve 268 and close to prevent upstream flow to the control valve 268. It will be appreciated that the check valve 276 may be any type of valve that allows for flow in a first direction and restricts flow in a second opposing direction.

The reservoir 204 is downstream of the check valve 276 and is configured to retain the stripping gas 244 therein. As described above, the stripping gas 244 retained within the reservoir 204 may be an actual stripping gas functioning to strip oxygen from the liquid fuel 228 within the contactor 206, or alternatively may be a sparging gas bubbled through a liquid fuel 228 to reduce an oxygen content of such fuel. For example, the stripping gas 244 may be an inert gas, such as Nitrogen or Carbon Dioxide (CO2), a gas mixture made up of at least 50% by mass inert gas, or some other gas or gas mixture having a relatively low oxygen content.

In various embodiments, the reservoir 204 may retain the stripping gas 244 at a pressure that is greater than ambient pressure. For example, the stripping gas 244 may be retained within the reservoir 204 at a pressure that is at least two times ambient pressure or any pressure that is greater than two times ambient pressure (e.g., three times ambient pressure). In addition, the stripping gas 244 may be exhausted from the reservoir 204 at various pressures. For example, the stripping gas 244 may be exhausted from the reservoir 204 at a pressure of at least fifty (50) pounds per square inch (psi), sixty (60) psi, seventy (70) psi, eighty (80) psi, ninety (90) psi, one hundred (100) psi, and/or greater than one hundred (100) psi.

In some examples, a reservoir sensor 278 may be operably coupled with the reservoir 204. The reservoir sensor 278 may be any practicable sensor that is configured to detect at least one of a volume and/or a pressure of the stripping gas 244 within the reservoir 204. In such instances, based on the data provided from the reservoir sensor 278, and/or any other information, the control valve 268 may direct the stripping gas 244 into the reservoir 204.

In several embodiments, a reservoir supply valve 280 may be operably coupled with the reservoir gas flowpath 272 downstream of the reservoir 204. In some instances, the reservoir 204 may be configured to selectively provide the stripping gas 244 from the reservoir 204 to a fuel system component 282 within the fuel system 270 in response to the detection of a purge condition. For example, the fuel system 270 may be the fuel manifold 240, the fuel nozzle 242 within a combustion section of a turbine, the fuel source 232, an ullage 284 of the fuel source 232, any other component of the fuel system 270, and/or any other component that is operably coupled with the gas turbine engine and/or an aircraft. Additionally, the purge condition may be a shutdown operating mode, a component of the fuel system 270 exceeding a predefined temperature threshold, a change in a flight condition, and/or any other condition.

In embodiments in which the stripping gas 244 may be directed to the fuel manifold 240 and/or the fuel nozzle 242 within a combustion section of a turbine based on the detection of a shutdown operating mode, the stripping gas 244 may be configured to purge stagnate reduced oxygen outlet fuel 238 therefrom. By purging the outlet fuel 238 from the fuel manifold 240 and/or the fuel nozzle 242, an amount of coke accumulation may be reduced. In addition, the stripping gas 244 may also increase the cooling rate (i.e., the cooling of the component is quicker) at which the fuel manifold 240, the combustion section of the turbine, and/or other components of the turbine may be cooled. By increasing the rate of cooling process of the turbine, the amount of coke accumulation can further be reduced. Additionally or alternatively, by providing the stripping gas 244 to the fuel manifold 240 in response to detection of the shutdown operating mode, negative impacts on the turbine may be reduced. It will be appreciated that providing the stripping gas 244 means providing at least a portion of the stripping gas 244.

Referring still to FIG. 2, in some embodiments, the fuel source 232 is configured as a fuel tank 234. Within the fuel tank 234, the fuel source 232 includes an amount of liquid fuel 228 and an amount of vapor/air/gas. The space within the fuel tank 234 containing the vapor/air/gas (e.g., within the fuel tank 234 and above the liquid fuel 228) may generally be referred to as the ullage 284. During operation, the reservoir 204 may provide the stripping gas 244 to the ullage 284 of the fuel source 232 to reduce an oxygen content of the liquid fuel 228 to provide a relatively low oxygen content flow of liquid fuel 228 to the contactor 206. By reducing an oxygen content of the vapor/air/gas in the ullage 284, a risk of flame-ups or fires within the fuel tank 234 in case of a spark may be reduced. Further, by reducing an oxygen content of the liquid fuel 228 provided to the contactor 206, an increased amount of heat may be added thereto with reduced risk of coking (allowing for increased efficiencies in the combustion process and providing an effective heat sink).

Moreover, in various embodiments, an aircraft supporting a turbine having the fuel oxygen reduction unit 202 described herein may alter one or more flight conditions. For example, the flight condition may include a change in altitude. In some instances, the change in altitude may alter a pressure or other condition of the fuel source 232. In response, the reservoir 204 may provide additional stripping gas 244 to the ullage 284.

Additionally or alternatively, the flight condition may include a change in an operating condition. For example, the turbine may be configured as a hybrid propulsion system in which various components of the turbine are powered by combustion during a first period and with an electrical system during a second period. In such instances, the change in flight condition may be a change from the first period to the second period. For instance, the turbine may be powered by combustion during a take-off operation and by electric power during a steady-state operation. As such, upon the turbine transferring to electric power, the reservoir 204 may purge outlet fuel 238 from the fuel manifold 240.

Still further, in some instances, one or more temperature sensors 286 may be operably coupled with various components of the fuel system 270. A threshold operating temperature may be defined for each of the various components. In the event that any of the various components exceeds its respective temperature threshold, the stripping gas 244 within the reservoir 204 may be directed to that component thereby cooling that component.

In various embodiments, the supply valve 280 may be a multi-directional valve that allows for flow in a variety of positions. For example, in a first position, the supply valve 280 may prevent the flow of the stripping gas 244 downstream of the supply valve 280. In a second position, the supply valve 280 may direct at least a portion of the stripping gas 244 to the fuel manifold 240. In a third position, the control valve 268 may direct at least a portion of the stripping gas 244 into the fuel source 232. As such, when the control valve 268 is in a position other than the first position, at least a portion of the stripping gas 244 may be provided to a component of the turbine, the aircraft, and/or otherwise exhausted from the reservoir 204. It will be appreciated that the supply valve 280 may direct all of the stripping gas 244 towards a first component when placed in a defined position. Additionally or alternatively, the supply valve 280 may direct a first portion of the stripping gas 244 towards a first component and a second portion of the stripping gas 244 towards a second component when placed in a defined position. In various embodiments, the first portion may be less than one-hundred percent (100%), ninety percent (90%), eighty percent (80%), seventy percent (70%), sixty percent (60%), fifty percent (50%), forty percent (40%), thirty percent (30%), twenty percent (20%), or ten percent (10%) of the stripping gas 244 that passes through the control valve 268. Likewise, the second portion may be less than one-hundred percent (100%), ninety percent (90%), eighty percent (80%), seventy percent (70%), sixty percent (60%), fifty percent (50%), forty percent (40%), thirty percent (30%), twenty percent (20%), or ten percent (10%) of the stripping gas 244 that passes through the supply valve 280.

In various embodiments, any of the control valve 268, the bypass valve 274, the supply valve 280, and/or the variable flow valve 262 may be configured as a throttling device that is generally capable of expanding the stripping gas. In embodiments in which any of the control valve 268, the bypass valve 274, the supply valve 280, and/or the variable flow valve 262 are configured as a throttling device, the throttling device may generally expand the stripping gas, lowering the pressure and temperature thereof. In some exemplary embodiments, the control valve 268, the bypass valve 274, the supply valve 280, and/or the variable flow valve 262 may be a Joule-Thomson expansion valve, also known as a "J-T valve." Additionally or alternatively, the control valve 268, the bypass valve 274, the supply valve 280, and/or the variable flow valve 262 may be an ejector. In still other exemplary embodiments, a capillary tube, fixed orifice, or other suitable apparatus may be utilized as or in conjunction with the control valve 268, the bypass valve 274, the supply valve 280, and/or the variable flow valve 262.

Further, the fuel oxygen reduction unit 202 is operable with a control system. The control system generally includes a sensor 288 configured to sense data indicative of a rotational speed of the input shaft 254 of the fuel gas separator 208, the separation assembly of the fuel gas separator 208, or both, as well as a computing system 290. Additionally, or alternatively, the control system may be operable with one or more sensors of an engine with which it is installed. For example, the control system may be configured to receive data indicative of a rotational speed of a spool (such as an HP spool) driving an accessory gearbox, which is, in turn, driving the fuel gas separator 208. Such rotational speed of the spool may be used to determine a rotational speed of the fuel gas separator 208.

The computing system 290 depicted includes one or more processor(s) 292 and one or more memory device(s) 294. The one or more processor(s) 292 can include any suitable processing device, such as a microprocessor, microcontroller, integrated circuit, logic device, and/or another suitable processing device. The one or more memory device(s) 294 can include one or more computer-readable media, including, but not limited to, non-transitory computer-readable media, RAM, ROM, hard drives, flash drives, and/or other memory devices.

The one or more memory device(s) 294 can store information accessible by the one or more processor(s) 292, including computer-readable instructions 296 that can be executed by the one or more processor(s) 292. The instructions 296 can be any set of instructions that when executed by the one or more processor(s) 292, cause the one or more processor(s) 292 to perform operations. In some embodiments, the instructions 296 can be executed by the one or more processor(s) 292 to cause the one or more processor(s) 292 to perform operations, such as any of the operations and functions for which the control system and/or the computing system 290 are configured, the operations for operating a fuel oxygen reduction unit 202 (e.g., method 400), as described herein, and/or any other operations or functions. The instructions 296 can be software written in any suitable programming language or can be implemented in hardware. Additionally, and/or alternatively, the instructions 296 can be executed in logically and/or virtually separate threads on the one or more processor(s) 292. The one or more memory device(s) 294 can further store data (such as data from sensors 264, 278, 286, 288) that can be accessed by the one or more processor(s) 292.

The exemplary computing system 290 depicted also includes a network interface 298 used to communicate, for example, with the components of the gas supply system 200 including the fuel oxygen reduction unit 202 (e.g., via a network, or rather a wireless communication network 300 for the embodiment shown) and/or the reservoir 204. The network interface 298 can include any suitable components for interfacing with one or more network(s), including for example, transmitters, receivers, ports, controllers, antennas, and/or other suitable components.

The inherent flexibility of computer-based systems and controllers, however, allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Referring still to the embodiment depicted in FIG. 2, it will further be appreciated that for the embodiment shown, the sensors 264, 278, 288, the control valve 268, the bypass valve 274, the supply valve 280, and/or the variable flow valve 262 are each operably connected, or operably in communication with, the computing system 290 through the wireless communication network 300. However, in other embodiments, any other suitable communication network may be provided, such as a wired or combination wired and wireless communication network.

In such a manner, it will further be appreciated that the control valve 268, the bypass valve 274, and/or the supply valve 280 may be configured as electrically actuated fluid valves. Accordingly, the computing system 290 may be configured to completely shut off the stripping gas 244 flow through the circulation gas flowpath 220 during certain operations (e.g., when the separation assembly of the fuel gas separator 208 is rotating below the minimally efficient rotational speed, during a failure scenario, etc.). It will be appreciated that when the control valve 268, the bypass valve 274, and the supply valve 280 are closed, substantially no stripping gas 244 may flow through the separator inlet 248 of the fuel gas separator 208, such that substantially only liquid fuel 228 flows through the fuel gas separator 208. Such may be beneficial, e.g., during startup operating conditions to prime the fuel gas separator 208 and to allow it time to come up to speed. Additionally, such may be helpful during shut down operating conditions of the engine, wherein the rotational speed is decreasing.

Notably, in various aspects, the control valve 268 and the bypass valve 274 may be closed when the gas turbine engine and fuel oxygen reduction unit 202 is entering into a shut-off or shut down operating mode. In such a manner, a flow of stripping gas 244 from the circulation gas flowpath 220 may be stopped, and the relatively low oxygen content gas within the circulation gas flowpath 220 may be trapped and stored within the circulation gas flowpath 220. In addition, the supply valve 280 may be opened to allow for the stripping gas 244 to be exhausted from the reservoir 204 to the fuel system component 282.

Figure 3:
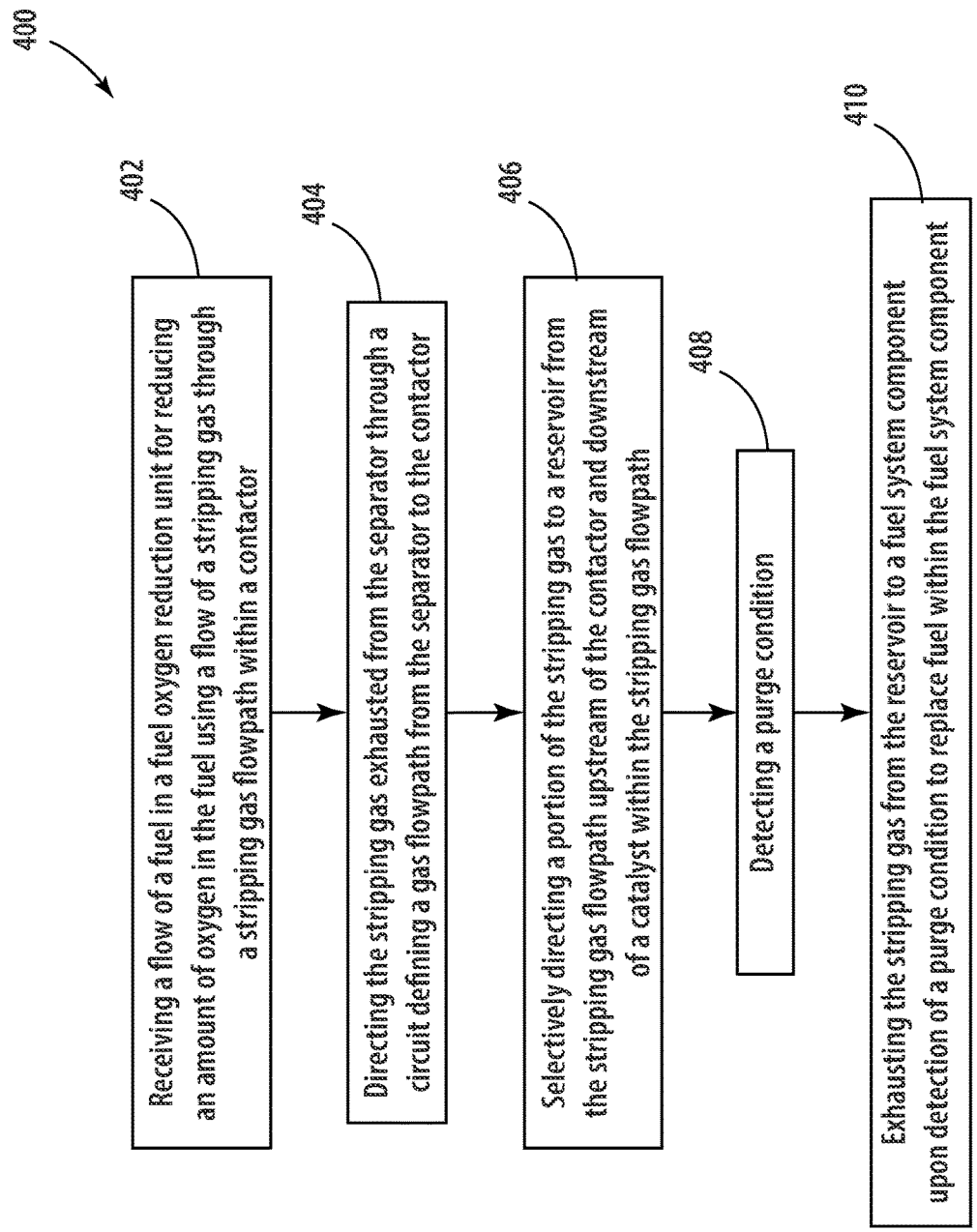
FIG. 3 is a flow diagram of a method for operating a fuel system for a gas turbine engine having a fuel oxygen reduction unit in accordance with various aspects of the present disclosure.

Referring now to FIG. 3, a flow diagram of a method 400 for operating a fuel system for a gas turbine engine. The method 400 may generally be operable with one or more of the turbofan engines 100 described above with reference to FIGS. 1 and 2. However, it will be appreciated by those of ordinary skill in the art that the disclosed method 400 may generally be utilized with any suitable engine and/or fuel oxygen reduction unit may be utilized in connection with a system having any other suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As is depicted, the method 400 includes at (402) receiving a flow of a fuel in a fuel oxygen reduction unit for reducing an amount of oxygen in the fuel using a flow of a stripping gas through a stripping gas flowpath within a contactor. In general, the contactor may be configured in any suitable manner to substantially mix a received gas and liquid flow. For example, the contactor may receive a stripping gas and a fuel. From the contactor, the stripping gas/fuel mixture is directed to the separator. Within the separator, the stripping gas, which may have relatively high oxygen content, may be separated from the fuel, which may have a relatively low oxygen content, back into respective flows of an outlet stripping gas and outlet fuel.

The exemplary method 400 depicted in FIG. 3 includes at (404) directing the stripping gas exhausted from the separator through a circuit defining a gas flowpath from the separator to the contactor. A fuel oxygen reduction unit is fluidly coupled with the circuit. In various embodiments, the fuel oxygen reduction unit can include a compressor, a heater, a catalyst, and a reservoir.

The exemplary method 400 depicted in FIG. 3 further includes at (406) selectively directing a portion of the stripping gas to the reservoir from the stripping gas flowpath upstream of the contactor and downstream of a catalyst within the stripping gas flowpath. In various embodiments, the reservoir may retain the stripping gas at a pressure that is greater than ambient pressure.

The method 400 further includes at (408) detecting a purge condition. In response to detection of the purge condition, the method 400 at (410) includes exhausting the stripping gas from the reservoir to a fuel system component in response to detection of a purge condition. In some instances, the reservoir may be configured to selectively provide the stripping gas from the reservoir to a fuel system component in response to the detection of a purge condition. For example, the stripping gas may be directed to the fuel manifold, a fuel nozzle within a combustion section of a turbine, the fuel source, an ullage of a fuel source, any other component of the fuel system, and/or any other component that is within the gas turbine engine and/or an aircraft. Additionally, the purge condition may be a shutdown operating mode of a turbine operably coupled with the fuel system, a component of the fuel system exceeding a predefined temperature threshold, a change in a flight condition, and/or any other condition.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Further aspects of the disclosure are provided by the subject matter of the following clauses:

A gas supply system for a gas turbine engine having a fuel system component, the gas supply system comprising: a fuel oxygen reduction unit having a circuit defining a gas flowpath for a flow of a stripping gas; and a reservoir in selective fluid communication with the fuel oxygen reduction unit and configured to store a portion of the stripping gas from the circuit, the reservoir further configured to be in selective fluid communication with the fuel system component when installed in a vehicle to provide the stored portion of the stripping gas to the fuel system component in response to detection of a purge condition.

The gas supply system of one or more of these clauses, wherein the fuel oxygen reduction unit further comprises: a contactor including a fuel inlet configured to receive a flow of a fuel and a stripping gas inlet configured to receive a flow of a stripping gas, the contactor configured to form a stripping gas/fuel mixture; and a separator in fluid communication with the contactor and configured to receive the stripping gas/fuel mixture from the contactor.

The gas supply system of one or more of these clauses, wherein the fuel system component is a fuel manifold.

The gas supply system of one or more of these clauses, wherein the fuel system component is a fuel nozzle within a combustor.

The gas supply system of one or more of these clauses, wherein the fuel system component is an ullage of a fuel source, the fuel source further storing the fuel.

The gas supply system of one or more of these clauses, wherein the stripping gas is an inert gas.

The gas supply system of one or more of these clauses, wherein the purge condition is a shutdown operating mode of the gas turbine engine operably coupled with the fuel system component.

The gas supply system of one or more of these clauses, wherein, in response to detection of the shutdown operating mode, the stripping gas is provided to a fuel manifold to purge residual fuel within the fuel manifold and cool the fuel manifold.

The gas supply system of one or more of these clauses, wherein the purge condition is the fuel system component exceeding a predefined temperature threshold.

The gas supply system of one or more of these clauses, wherein the purge condition is a change in a flight condition.

The gas supply system of one or more of these clauses, wherein the stripping gas is exhausted from the reservoir at a pressure of at least 80 pounds per square inch (psi).

The gas supply system of one or more of these clauses, further comprising: a control valve downstream of a catalyst and upstream of the contactor, the control valve configured to selectively direct at least a portion of the stripping gas to the contactor in a first position and the reservoir in a second position.

The gas supply system of one or more of these clauses, further comprising: a reservoir supply valve downstream of the reservoir and upstream of the fuel system component, the reservoir supply valve configured to selectively direct at least a portion of the stripping gas within the reservoir to the fuel system component.

A method for operating a fuel system for a gas turbine engine, the method comprising: receiving a flow of a fuel in a fuel oxygen reduction unit of the fuel system; reducing an amount of oxygen in the fuel using a flow of a stripping gas through a stripping gas flowpath within a contactor; and selectively directing a portion of the flow of the stripping gas from the stripping gas flowpath to a reservoir at a location upstream of the contactor.

The method of one or more of these clauses, further comprising: detecting a purge condition; and providing the stripping gas from the reservoir to a fuel system component in response to detection of the purge condition.

The method of one or more of these clauses, wherein the fuel system component is a fuel manifold.

The method of one or more of these clauses, wherein detecting a purge condition includes detecting a shutdown operating mode of the gas turbine engine.

A gas supply system comprising: a fuel oxygen reduction unit having a circuit defining a gas flowpath for a flow of a stripping gas; and a reservoir fluidly coupled with the circuit and configured to store a portion of the stripping gas, wherein the reservoir is configured to store stripping gas remote from a fuel source.

The gas supply system of one or more of these clauses, wherein the stripping gas is provided from the reservoir to a fuel system component in response to detection of a purge condition.

The gas supply system of one or more of these clauses, wherein the fuel system component is a fuel manifold, and wherein the purge condition is a shutdown operating mode of a gas turbine engine.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas supply system for a gas turbine engine having a fuel system component, the gas supply system comprising:
  a fuel oxygen reduction unit having a circuit defining a gas flowpath for a flow of a stripping gas;
  one or more temperature sensors operably coupled with the fuel system component; and
  a reservoir in selective fluid communication with the fuel oxygen reduction unit and configured to store a portion of the stripping gas from the circuit, the reservoir in selective fluid communication with the fuel system component when installed in a vehicle, wherein the reservoir is configured to provide the stored portion of the stripping gas to the fuel system component in response to detection of the fuel system component exceeding a temperature threshold, wherein the fuel system component is a fuel nozzle or a fuel manifold in a combustor.

2. The gas supply system of claim 1, wherein the fuel oxygen reduction unit further comprises:
  a contactor including a fuel inlet configured to receive a flow of a fuel and a stripping gas inlet configured to receive the flow of the stripping gas, the contactor configured to form a stripping gas/fuel mixture; and
  a separator in fluid communication with the contactor and configured to receive the stripping gas/fuel mixture from the contactor.

3. The gas supply system of claim 1, wherein the fuel system component is an ullage of a fuel source, the fuel source further storing a fuel.

4. The gas supply system of claim 1, wherein the stripping gas is an inert gas.

5. The gas supply system of claim 1, further comprising:
  a reservoir sensor operably coupled with the reservoir, the reservoir sensor configured to detect a volume of the stripping gas within the reservoir.

6. The gas supply system of claim 1, further comprising:
  a reservoir sensor operably coupled with the reservoir, the reservoir sensor configured to detect a pressure of the stripping gas within the reservoir.

7. The gas supply system of claim 1, wherein the stripping gas is configured to reduce a temperature of the fuel system component to a temperature below the temperature threshold.

8. The gas supply system of claim 1, wherein the stripping gas is exhausted from the reservoir at a pressure of at least 80 pounds per square inch (psi).

9. The gas supply system of claim 1, further comprising:
  a reservoir supply valve downstream of the reservoir and upstream of the fuel system component, the reservoir supply valve configured to selectively direct at least a portion of the stripping gas within the reservoir to the fuel system component.

10. The gas supply system of claim 2, further comprising:
  a control valve downstream of a catalyst and upstream of the contactor, the control valve configured to selectively direct at least a portion of the stripping gas to the contactor in a first position and the reservoir in a second position.

11. A method for operating a fuel system for a gas turbine engine, the method comprising:
  receiving a flow of a fuel in a fuel oxygen reduction unit of the fuel system;
  reducing an amount of oxygen in the fuel using a flow of a stripping gas through a stripping gas flowpath within a contactor;
  selectively directing a portion of a flow of a stripping gas from the stripping gas flowpath to a reservoir at a location upstream of the contactor; and
  providing the stripping gas from the reservoir to a fuel system component in response to detection of a temperature of the fuel system component exceeding a temperature threshold.

12. The method of claim 11, further comprising:
  detecting the temperature of the fuel system component through one or more temperature sensors.

13. The method of claim 11, wherein the fuel system component is a fuel manifold.

14. The method of claim 11, wherein the fuel system component is a fuel nozzle.

15. A gas supply system comprising:
  a fuel oxygen reduction unit having a circuit defining a gas flowpath for a flow of a stripping gas;
  a first component;
  a second component;
  one or more temperature sensors respectively coupled with the first component and the second component; and
  a reservoir fluidly coupled with the circuit and configured to store a portion of the stripping gas, wherein the reservoir is configured to provide the stored portion of the stripping gas to the first component in response to detection of the first component exceeding a first temperature threshold and to the second component in response to detection of the second component exceeding a second temperature threshold, wherein each of the first component and the second component are a fuel nozzle or a fuel manifold.

16. The gas supply system of claim 15, wherein the reservoir is configured to store the stripping gas remote from a fuel source.

* * * * *